(12) United States Patent
Krause et al.

(10) Patent No.: US 8,191,513 B2
(45) Date of Patent: Jun. 5, 2012

(54) SYSTEM AND METHOD FOR CONTROLLING A PUMP IN A RECIRCULATING HOT WATER SYSTEM

(75) Inventors: Timothy D. Krause, Cypress, CA (US); David Weinkle, Cypress, CA (US)

(73) Assignee: TDK Family Limited Partnership, Cypress, CA (US)

( * ) Notice: Subject to any disclaimer, the term of this patent is extended or adjusted under 35 U.S.C. 154(b) by 870 days.

(21) Appl. No.: 12/248,859

(22) Filed: Oct. 9, 2008

(65) Prior Publication Data
US 2010/0089339 A1 Apr. 15, 2010

(51) Int. Cl.
*F22D 5/18* (2006.01)

(52) U.S. Cl. ............ 122/415; 122/20 R; 122/406.1; 237/12.3 B; 237/19; 237/59

(58) Field of Classification Search ............ 237/19, 237/59, 62, 12.3 B; 122/20 R, 19.1, 406.1, 122/414, 415
See application file for complete search history.

(56) References Cited

U.S. PATENT DOCUMENTS

| | | | | |
|---|---|---|---|---|
| 3,597,588 A | | 8/1971 | Kirschner et al. | |
| 3,999,709 A | * | 12/1976 | Estabrook | 237/8 R |
| 4,231,328 A | * | 11/1980 | Lang et al. | 122/504 |
| 4,832,259 A | * | 5/1989 | Vandermeyden | 236/20 R |
| 5,056,712 A | * | 10/1991 | Enck | 236/20 R |
| 5,626,287 A | * | 5/1997 | Krause et al. | 236/20 R |
| 6,293,471 B1 | | 9/2001 | Stettin et al. | |
| 6,588,377 B1 | * | 7/2003 | Leary et al. | 122/19.1 |
| 7,017,472 B2 | | 3/2006 | Grant et al. | |
| 7,028,768 B2 | | 4/2006 | Aler et al. | |
| 7,327,950 B2 | * | 2/2008 | Cohen | 392/461 |
| 2007/0170273 A1 | * | 7/2007 | McIllwain | 237/19 |
| 2008/0006227 A1 | * | 1/2008 | Ziehm et al. | 122/19.1 |
| 2009/0224062 A1 | * | 9/2009 | Giannetti et al. | 237/19 |

OTHER PUBLICATIONS

Tekmar Data Brochure—Mixing Control 356; dated: 2000; 16 pages.

* cited by examiner

*Primary Examiner* — Gregory A Wilson
(74) *Attorney, Agent, or Firm* — Christie, Parker & Hale, LLP

(57) ABSTRACT

A system and a method for controlling a pump in a recirculating hot water system is provided. In one embodiment, the invention relates to a method for controlling a temperature of water in a recirculating hot water system including a storage tank for storing heated water, a recirculation conduit including a supply conduit for supplying the heated water to users via a plurality of outlets having a first outlet and a last outlet and a return conduit for returning an unused portion the heated water to the storage tank, a pump for circulating the heated water, the pump disposed along the return conduit, the method including measuring, at a point along the recirculation conduit, a temperature of the heated water provided from the storage tank, and controlling a speed of the pump, disposed along the return conduit, based on the measured temperature.

27 Claims, 12 Drawing Sheets

| Temp. Range | Range Label | Adaptive Action | Motor Drive Speed | Motor Operation Time at Range |
|---|---|---|---|---|
| +5 to 5.9 | 5 | ↑SET $T_D$ to 80% Tr | $S_5$ (PWM=0) | 0 |
| +4 to 4.9 | 4 | ↑SET $T_C$ to 80% Tr | $S_4$ (PWM=0) | 0 |
| +3 to 3.9 | 3 | ↑SET $T_B$ to 80% Tr | $S_3$ (PWM=0) | 0 |
| +2 to 2.9 | 2 | ↑SET $T_A$ to 80% Tr | $S_2$ (PWM=0) | 0 |
| +1 to 1.9 | 1 | ↑Lower $S_{DWELL}$ & $S_1$ by 5% | $S_1$ (PWM$_{init}$ =10%) ¼ | |
| SP-0.9 to SP+0.9 | SP | None | $S_{DWELL}$ (PWM$_{init}$=10%) | $T_{DWELL}$ |
| -1 to -1.9 | A | | $S_A$ (PWM$_{init}$ =20%) | $T_A$ |
| -2 to -2.9 | B | ↓RAISE $S_A$ 5% | $S_B$ (PWM$_{init}$ =30%) | $T_B$ |
| -3 to -3.9 | C | ↓RAISE $S_B$ 5% | $S_C$ (PWM$_{init}$ =50%) | $T_C$ |
| -4 to -4.9 | D | ↓RAISE $S_C$ 5% | $S_D$ (PWM$_{init}$ =80%) | $T_D$ |
| -5 to -5.9 | E | ↓RAISE $S_D$ 10% | $S_E$ (PWM =100%) | $T_E$ |

FIG. 4

SYSTEM AND METHOD FOR CONTROLLING A PUMP IN A RECIRCULATING HOT WATER SYSTEM

BACKGROUND OF THE INVENTION

The present invention relates generally to a system and a method for controlling a pump in a recirculating hot water system and, more particularly, to a system for controlling a pump in accordance with a measured demand for hot water.

Any system for providing hot water in a building must be capable of providing sufficient hot water to supply the needs of the building's occupants. Traditionally, this has been accomplished using a recirculation pump to circulate the heated water from a hot water heater to occupants and an internal thermostatic control, or "aquastat", to control the temperature of a hot water heater or boiler. The recirculation pumps are typically operated at a constant or fixed speed. During non-peak periods, the practice of operating the recirculation pump at constant or fixed speed results in both heat loss in the hot water system and electrical energy loss in the recirculation pump. A system and method for controlling a hot water heater to reduce heat loss during periods of non-use is discussed in U.S. Pat. No. 5,626,287 to Krause et al., the entire content of which is expressly incorporated herein by reference.

The electrical energy loss for fixed speed operation of a recirculation pump during non-peak periods can be substantial. Further, such operation is particularly inefficient in large recirculating hot water systems featuring pumps capable of circulating significant volumes of water. In a number of hot water systems, the recirculation pumps are oversized to meet maximum demand requirements for the heated water. Such oversized pumps consume even more electrical and thermal energy than the conventional recirculation pumps.

SUMMARY OF THE INVENTION

Aspects of the invention relate to a system and a method for controlling a pump in a recirculating hot water system. In one embodiment, the invention relates to a recirculating hot water system including a storage tank for storing heated water, a recirculation conduit including a supply conduit for supplying the heated water to users via a plurality of outlets having a first outlet and a last outlet, and a return conduit for returning an unused portion of the heated water to the storage tank, a pump for circulating the heated water, the pump disposed along the return conduit, a temperature sensor, disposed along the recirculation conduit, for generating a temperature signal indicative of a temperature of the heated water, and a control unit, coupled to the pump, for changing a speed of the pump based on the temperature signal, where the control unit is configured to store a first temperature value of the temperature signal at a first time, increase the speed of the pump to raise the temperature of the heated water to a preselected second temperature value, measure a time elapsed as the measured temperature increases from the first temperature to the preselected second temperature, and operate the pump for a period of time based at least in part on the time elapsed.

In another embodiment, the invention relates to a method for controlling a temperature of water in a recirculating hot water system including a storage tank for storing heated water, a recirculation conduit including a supply conduit for supplying the heated water to users via a plurality of outlets having a first outlet and a last outlet and a return conduit for returning an unused portion the heated water to the storage tank, a pump for circulating the heated water, the pump disposed along the return conduit, the method including measuring, at a point along the recirculation conduit, a temperature of the heated water provided from the storage tank, and controlling a speed of the pump, disposed along the return conduit, based on the measured temperature, storing a first temperature based on the measured temperature, increasing the speed of the pump to raise the heated water to a preselected second temperature, measuring a time elapsed as the measured temperature increases from the first temperature to the preselected second temperature, and operating the pump for a period of time based at least in part on the time elapsed.

In still another embodiment, the invention relates to a method for controlling a pump in a recirculating hot water heating system, the method including measuring, repeatedly, a temperature of water in the hot water heating system, storing a first temperature based on the measured temperature at a first time, increasing a speed of the pump to raise the first temperature to a preselected second temperature, measuring a time elapsed as the measured temperature increases from the first temperature to the preselected second temperature, and operating the pump for a period of time based at least in part on the time elapsed.

In a further embodiment, the invention relates to a method for controlling a pump in a recirculating hot water heating system, the method including storing a setpoint temperature for water in the hot water heating system, measuring a temperature of water in the hot water heating system, operating the pump at a first speed when the measured temperature is within a first temperature range, where the first range is lower than the setpoint, operating the pump at a second speed when the measured temperature is within a second temperature range, where the second range is lower than the first range, and increasing the first speed when the measured temperature falls to the second temperature range.

BRIEF DESCRIPTION OF THE DRAWINGS

FIG. 4 is a table illustrating a method for controlling a variable speed pump in accordance with one embodiment of the present invention.

DETAILED DESCRIPTION OF THE INVENTION

Figure 1:
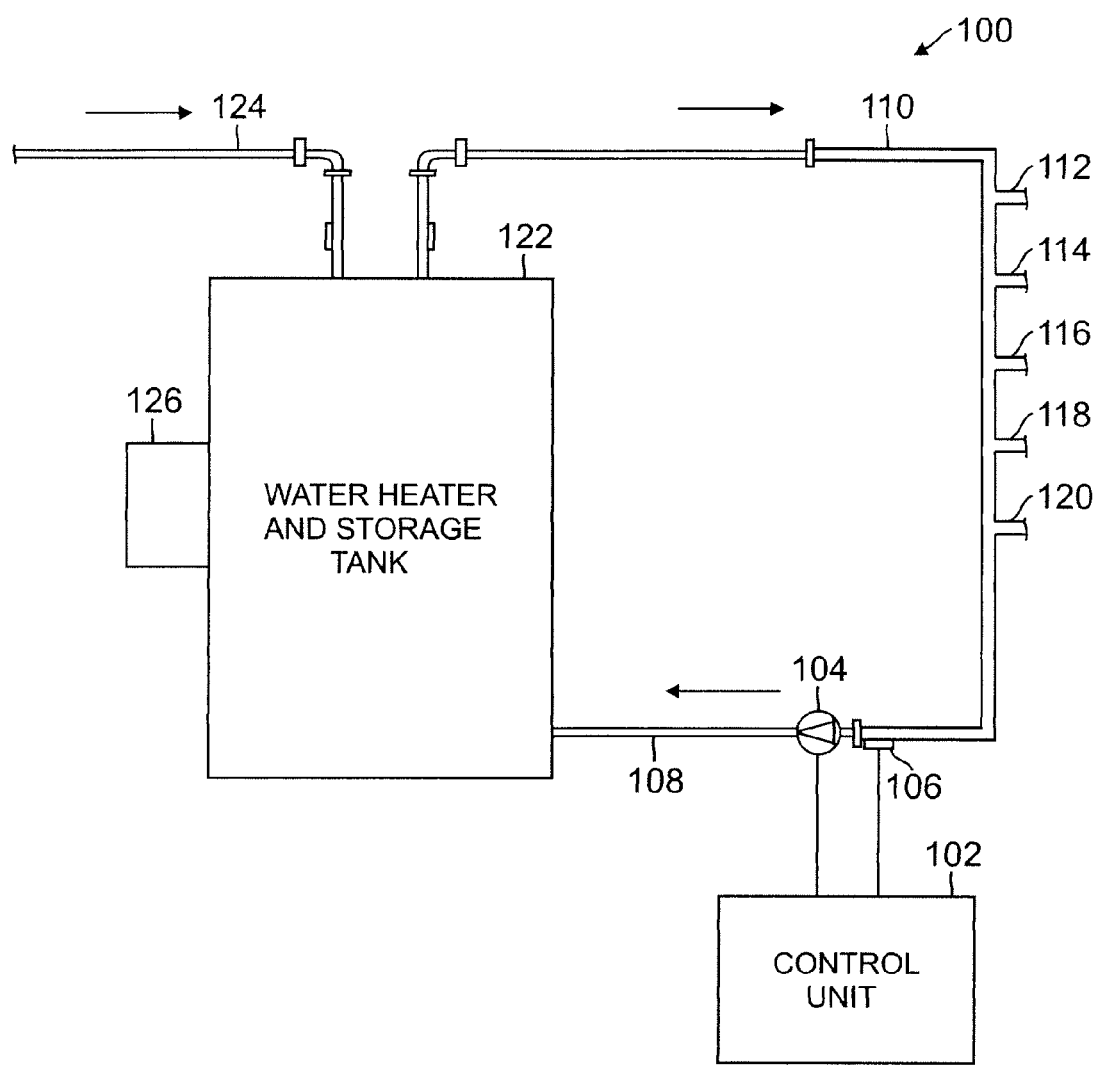
FIG. 1 is a schematic block diagram of a tank-type recirculating hot water system including a control unit, a variable speed pump and a temperature sensor in accordance with one embodiment of the present invention.

Referring now to the drawings, embodiments of systems and methods for controlling the speed of a variable speed pump in a recirculating hot water system are illustrated. Embodiments of control systems determine actual hot water demand by measuring temperature changes at critical points in the recirculating hot water system. In one embodiment, the control systems measure temperature changes at or near a last tap along a series of taps for user consumption of hot water within the recirculating hot water system. In another embodiment, the control systems measure temperature changes at a location proximate the variable speed pump along a return conduit coupled to a hot water storage tank within the recirculating hot water system.

Based on changes in temperature and various calibration parameters, the control systems speed up, slow down or maintain the speed of the variable speed pump. In several embodiments where the measured temperature at a critical point drops by a predetermined threshold based on hot water consumption, the control system increases the speed of the variable speed pump to circulate water of a higher temperature from a storage tank at a faster rate. Alternatively, at times of non-use, the control system reduces the speed of the variable speed pump to a predetermined minimum to maximize both thermal and electrical energy savings.

Embodiments of control systems can also employ a technique for measuring a heat loss characteristic of a recirculating hot water system. The technique involves measuring a recovery time of the system from an inflection point defined by a point where temperature changes from a downward temperature trend to an upward temperature change. The recovery time can be measured from the inflection point to a preselected temperature value or range. The control systems can then operate the variable speed pump for a period of time based in part on the recovery time. In several embodiments, the time of operation at ranges below a preselected setpoint is reduced to a percentage of the recovery time when the temperature overshoots the setpoint. In effect, the control system can use this technique to reduce or prevent overshooting the desired setpoint temperature for a recirculating hot water system.

Embodiments of control systems can also define a series of temperature ranges about a preselected setpoint, where each temperature range can have a preselected default pump speed. If the operating temperature decreases below the setpoint, the control system can adapt by increasing the default pump speeds at each temperature range that was crossed during the decrease. In such case, the control system continuously improves system performance in order to maintain a constant setpoint temperature.

FIG. 1 is a schematic block diagram of a tank-type recirculating hot water system 100 including a control unit 102, a variable speed pump 104 and a temperature sensor 106 in accordance with one embodiment of the present invention. The temperature sensor 106 is disposed just before the variable speed pump 104 along a return conduit 108. The return conduit 108 is coupled to a supply conduit 110 that includes five taps (112, 114, 116, 118, 120). In several embodiments, the taps are water outlets leading to user water consumption systems such as showers and faucets. The supply conduit 110 is also coupled to a hot water storage tank 122.

In the illustrated embodiment, the storage tank 122 includes an integrated water heater. In other embodiments, the water heater can be separate from the storage tank. A cold water supply conduit 124 supplies water, at a comparatively cold temperature, to the storage tank 122. The arrows along the conduits are indicative of the direction of water flow in the recirculation hot water system 100. An aquastat 126 is coupled to the water heater/storage tank 122 and is used to maintain a preselected temperature of water in the tank. In some embodiments, the temperature of the aquastat 126 is controlled according to a system and method for controlling a hot water heater to reduce heat loss during periods of non-use, which is discussed in U.S. Pat. No. 5,626,287 to Krause et al., the entire content of which is expressly incorporated herein by reference in its entirety.

In operation, the control unit 102 receives information indicative of the temperature of water in the system along the return conduit from the temperature sensor 106. The control unit 102 can store a preselected setpoint temperature. The setpoint temperature is an appropriate temperature for operation of the recirculating hot water system such that the last tap 120 receives hot water at a temperature sufficiently hot for an average user located at that last tap 120. In some embodiments, the setpoint temperature is determined by the user of the hot water system through experimentation. The control unit 102 can also store a number of temperature ranges above and below the setpoint temperature. For each temperature range, the control unit can also store a preselected pump speed specifying a speed for operation of the pump when the measured temperature provided by the temperature sensor 106 is within a respective temperature range. Also for each temperature range, the control unit can store a preselected time for pump operation for that range. In some embodiments, the operation time can be based on a characteristic recovery time of the system. The recovery time can be indicative of system heat losses associated the recirculating hot water system. In one embodiment, the recovery time can be measured from a temperature inflection point below the setpoint to an upper limit of a first range above the setpoint.

In some embodiments, the pump speed at each temperature range can be increased as the measured temperature drops below the setpoint. In such case, the hot water system responds to subsequent temperature drops more effectively. In several embodiments, the pump operation time for a particular temperature range, among those ranges below the setpoint, is scaled down or reduced each time the system overshoots the setpoint temperature. In such case, the control unit acts continuously to reduce or prevent overshooting the setpoint temperature. In several embodiments, the control unit acts to maintain a relatively constant temperature at the setpoint temperature such that water at the farthest or last tap 120 along the recirculation path is kept at a preselected temperature that is sufficiently warm.

In the embodiment illustrated in FIG. 1, the temperature sensor 106 is disposed along the return conduit 108 just before the variable speed pump 104. In other embodiments, the temperature sensor can be disposed at any number of different locations in the hot water system. In one embodiment, the temperature sensor is disposed proximate the last tap 120 (e.g., along the last tap, along the source conduit 110, or along the return conduit 108). In such case, the temperature sensor can communicate with the control unit using either a wired connection or a wireless connection. The wireless communication could be implemented using RF communication, line of sight optical communication or other wireless communication methods known in the art.

In other embodiments, the temperature sensor can be located anywhere along the return conduit 108. In such case, the temperature sensor can be located anywhere from the last tap to the pump. In other embodiments, the temperature sensor can be disposed in the vicinity of any of the taps or along the source conduit. In some embodiments, multiple temperature sensors are used. In one embodiment, the temperature sensor is implemented using a SB 10K Thermistor Sensor made by Goldine Controls, Inc. of North Kingston, R.I.

In the illustrated embodiment, the recirculating hot water system includes five taps. In other embodiments, the recirculating hot water system can include more than or less than five taps.

In one embodiment, the variable speed pump is a NRF-22 manufactured by Bell & Gossett of Morton Grove, Ill. In some embodiments, the variable speed pump is a conventional pump without an ability to operate at multiple speeds. In such case, the control unit 102 provides a power signal at a variable rate enabling speed control in accordance with the control methods described herein.

Figure 2:
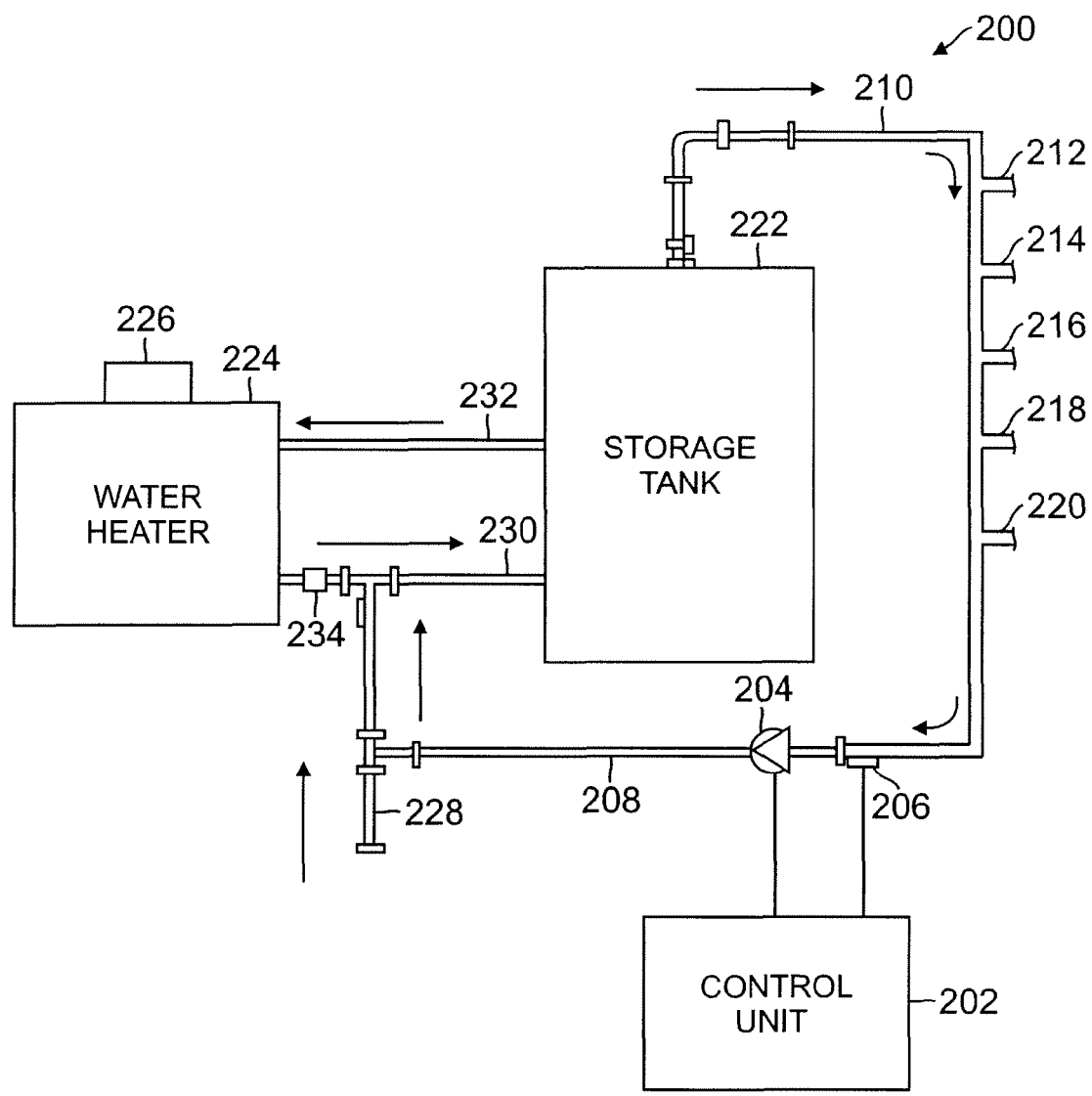
FIG. 2 is a schematic block diagram of an instantaneous recirculating hot water system including a control unit, a variable speed pump and a temperature sensor in accordance with another embodiment of the present invention.

FIG. 2 is a schematic block diagram of an instantaneous type recirculating hot water system 200 including a control unit 202, a variable speed pump 204, and a temperature sensor 206 in accordance with another embodiment of the present invention.

The temperature sensor 206 is disposed just before the variable speed pump 204 along a return conduit 208. The return conduit 208 is coupled to a supply conduit 210 that includes five taps (212, 214, 216, 218, 220). The supply conduit 210 is also coupled to a hot water storage tank 222.

The storage tank 222 is coupled to a water heater 224 by conduits 230 and 232. An inlet conduit 228 terminates into the conduit 230. A check valve 234 within the conduit 230 eliminates the flow of unheated water back into the instantaneous water heater 224, causing it to flow first to the storage tank 222 as indicated by arrows in FIG. 2. Heated water from the storage tank 222 then circulates through the hot water consumption circuit, including the taps (212, 214, 216, 218, 220), via the supply conduit 210 and the return conduit 208 which are similar to the corresponding elements of the water heating system of FIG. 1. This occurs under the influence of the variable speed recirculation pump 204, with the unused return water either entering the inlet conduit 228 at a location upstream of conduit 230, as illustrated in FIG. 2, or entering the conduit 230 at a point downstream of the inlet conduit 228 (not shown).

In other embodiments, the water heater can be integrated with the storage tank. The arrows along the conduits are indicative of the direction of water flow in the recirculation hot water system 200. An aquastat 226 is coupled to the water heater/storage tank 222 and is used to maintain a preselected temperature of water in the tank. In some embodiments, the temperature of the aquastat 226 is controlled according to a system and method for controlling a hot water heater to reduce heat loss during periods of non-use, which is discussed in U.S. Pat. No. 5,626,287 to Krause et al., the entire content of which is expressly incorporated herein by reference in its entirety.

In several embodiments, the control unit 202 and variable speed pump 204 can operate as described above in the description of FIG. 1. In some embodiments, the temperature sensor can be located at different locations along the source conduit and return conduit. In one embodiment, the temperature sensor can be disposed at any of the locations in the hot water system described above for FIG. 1.

Figure 3:
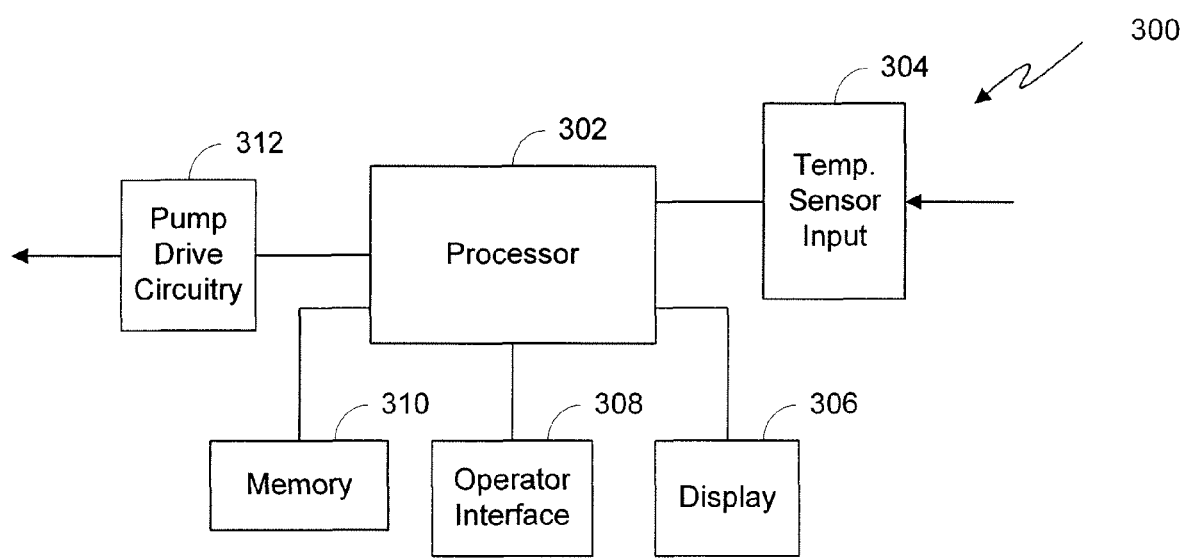
FIG. 3 is a block diagram of a control unit in accordance with one embodiment of the present invention.

FIG. 3 is a block diagram of a control unit 300 in accordance with one embodiment of the present invention. The control unit 300 includes a processor 302 coupled to temperature sensor input circuitry 304, a display 306, an operator interface 308, a memory 310 and pump drive circuitry 312. The temperature sensor input circuitry 304 can receive one or more signals indicative of the temperature measured by one or more temperature sensors. In some embodiments, the temperature sensor input circuitry 304 includes circuitry for converting analog signals to digital signals (e.g., A to D converter circuitry). In one embodiment, the temperature sensor input circuitry includes circuitry for communicating wirelessly with a temperature sensor.

The display 306 can provide information about the status and settings of the control unit 300 and recirculating hot water system. The operator interface 308 can enable a user/operator to change the operational characteristics of the control unit 300. For example, the user might change a setpoint temperature, temperature ranges, and/or default performance characteristics of those temperature ranges. In one embodiment, the display and operator interface are combined into a single device such as a touch screen or other suitable integrated display and input/output interface. In other embodiments, other performance characteristics can be modified. In some embodiments, the user can specify particular energy saving settings, or select from pre-programmed groups of energy saving settings.

The memory 310 can include volatile memory, such as random access memory, and/or non-volatile memory, such as ROMs, EEPROMs and flash memory. The pump drive circuitry 312 can include any number of drivers and/or other circuitry appropriate for controlling a pump. In some embodiments, the pump drive circuitry 312 includes circuitry capable of generating a pulse width modulated or phase modulated power signal. In several embodiments, the pump drive circuitry 312 includes circuitry for imposing a duty cycle on the power signal. In some cases, the imposition of the duty cycle allows the control unit 300 to scale down operation of a pump that has, for example, a minimum speed, or a pulse width modulated minimum required to keep the pump moving.

In several embodiments, the processor 302 is a microcontroller or digital signal processing chip. In some embodiments, the processor includes functionality enabling motor control such as pulse width modulation or phase modulation support. In the illustrated embodiment, the processor 302 is implemented as a single unit. In other embodiments, the processor 302 can be implemented using any combination of processors, memory, discrete logic components, data buses and/or other processing elements that share information. In one embodiment, the processor is a AT90USB64 manufactured by Atmel Corp. of San Jose, Calif.

In other embodiments, the control unit 300 can include additional circuitry for processing temperature input(s) and/or controlling a conventional recirculation pump or a variable speed pump.

FIG. 4 is a table illustrating a method for controlling a variable speed pump in accordance with one embodiment of the present invention. In specific embodiments, the method is performed by the control units of FIGS. 1-3. The table 400 includes columns for temperature range 402, range labels 404, adaptive action 406, motor drive speed 408 and time of operation at range 410. A row 412 in the middle of the table defines a range around a setpoint (SP). Temperature ranges higher than the setpoint make up the upper ranges (5, 4, 3, 2, 1), while those lower than the setpoint make up the lower ranges (A, B, C, D, E).

If the method determines that the current temperature is within one of the temperature ranges, the method performs the respective actions listed in the adaptive action column 406. In several embodiments, the method performs the adaptive actions only as the temperature is moving away from the setpoint (SP). Accordingly, the adaptive actions listed in the table are preceded by an up arrow or a down arrow to indicate that the action generally takes place when moving away from the setpoint. The motor drive speed column 408 lists speed labels (e.g., $S_5$) and default motor speed values (e.g., PWM=0) for each respective temperature range. The time of operation at range column 410 lists time parameters for the lower ranges (e.g., $T_A$) and zeros for much of the upper range. As operating temperatures rise above the setpoint, the control unit will generally set the pump speed to zero. In such case, the pump is effectively turned off.

In operation, the control unit (not shown) determines a characteristic recovery time (Tr) of a recirculating hot water system including a recirculation pump such as the hot water systems illustrated in FIGS. 1-2. The determination enables the control unit to learn some characteristic information about the hot water system it will control. This is especially useful as the characteristics of different hot water systems can vary significantly. For example, some systems may be well insulated to prevent heat loss while others are not. Similarly, some systems may have only a couple of taps while other systems can have over ten taps. In addition, the length of circulation conduits will vary from system to system.

Figure 5:
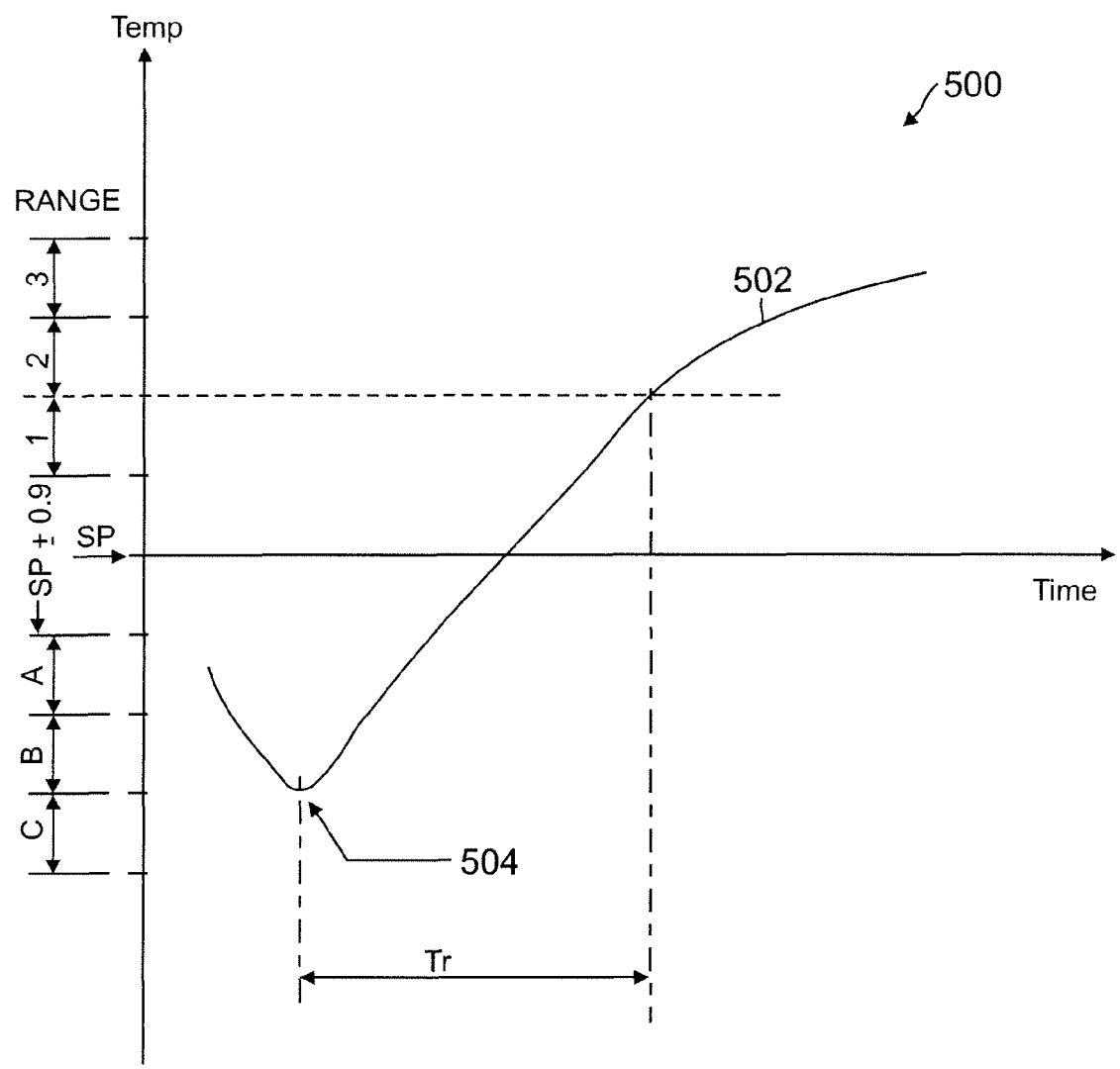
FIG. 5 is a graph of temperature versus time illustrating a determination of recovery time for a recirculating hot water system in accordance with the method of FIG. 4.

FIG. 5 is a graph of temperature measured by a temperature sensor versus time illustrating the determination of recovery time (Tr) for a recirculating hot water system in accordance with the method of FIG. 4. As illustrated in FIG. 5, the temperature 502 initially begins below the setpoint (SP) and decreases. At some point afterward, the recirculating hot water system (not shown) recovers and the temperature begins increasing at a temperature inflection point 504. As the temperature further increases, it crosses the setpoint temperature (SP) and extends beyond Range 1, indicated along the vertical temperature axis. The time elapsed from the inflection point to the upper limit of Range 1 is the recovery time (Tr). The control unit measures the recovery time (Tr), typically upon startup, and stores the value in memory. The recovery time (Tr) is a characteristic of the hot water system that is indicative of how much heat loss exists in the system and how quickly the system responds to adaptive action taken by the control unit to return to the setpoint temperature.

In returning to the operation of a control unit based on the table 400 in FIG. 4, an example is useful to illustrate operation. Supposing that the initial temperature is located at the setpoint and does not deviate from the indicated setpoint range (SP−0.9 to SP+0.9), the table indicates that the control unit takes no adaptive action and operates the pump at a dwell speed ($S_{DWELL}$) of 10 percent (PWM signal output) for an indefinite amount of time ($T_{DWELL}$). If the temperature increases to a level within Range 1, the control unit method can react by performing the associated adaptive action (e.g., lowering the SP dwell speed ($S_{DWELL}$) and Range 1 speed ($S_1$) by 5 percent). In such case, for example, the PWM speed of say 10 percent for either range would be decreased to 9.5 percent. The default speed of Range 1 ($S_1$) is a PWM signal of 10 percent scaled down by a one-fourth duty cycle. In one embodiment, the one-fourth duty cycle corresponds to providing the 10 percent PWM power signal for 15 seconds of each minute. The control unit can use the duty cycle to scale back operation of a pump that does not run comfortably, or at all, below, for example, say a 10 percent PWM power signal.

If the temperature increases to a level within Range 2, the control unit can react by setting the time of operation at Range A ($T_A$) to 80 percent of the recovery time (Tr) and setting the motor/pump speed ($S_2$) to zero (PWM=0). If the temperature is entering Range 2 for a second time, $T_A$ can be set to the recovery time scaled down twice such that $T_A$ equals Tr multiplied by 80 percent twice or Tr multiplied by 0.64. Thus, each time the temperature overshoots the setpoint, the method adapts the actions performed at the lower ranges to reduce future overshooting (e.g., by prematurely slowing the pump) and to maintain a steady state temperature at the setpoint. If the temperature increases beyond Range 2, similar actions are taken as indicated in table 400. If, on the other hand, the temperature decreases and is thus moving toward the setpoint, no adaptive action is taken.

Suppose now that the temperature decreases past the setpoint to a level within Range A, no adaptive action is taken but the pump speed ($S_A$) is increased to a speed or PWM power signal of 20 percent. The pump speed at Range A ($S_A$) is stored in memory. If the temperature decreases further to a level within Range B, the control unit raises the Range A speed ($S_A$) by 5 percent and sets speed ($S_B$) to 30 percent in accordance with the current temperature range. So, for this instance, $S_A$ would be increased to 21 percent. Thus, the next time the temperature is in the setpoint range and drops, the control unit will respond quicker than the previous occurrence. Similarly, as temperature drops further, the method increases the speed levels of prior ranges to more effectively react to temperature drops for future operation. In this way, the control unit method continuously improves its response to temperature variation. If the temperature increases from one of the lower ranges and thus rises toward the setpoint, the method performs no adaptive action and simply sets the speed of operation and time of operation to the respective values for the current temperature range.

While specific percentages are presented in table 400, the method can use other suitable percentages for the adaptive action and/or for the default pump speed (e.g., motor drive speed). Similarly, while specific temperature ranges are indicated for the upper and lower ranges, other suitable temperature ranges can be used that may be smaller or larger than the depicted temperature ranges. In other embodiments, the duty cycle for the setpoint range can be less than or greater than one-fourth. In the illustrated embodiment, the method uses recovery time to characterize the hot water system and to set parameters of pump control operation. In other embodiments, other characteristics of the hot water system can be used to set and/or modify the operational characteristics such as the time of operation.

Figure 6:
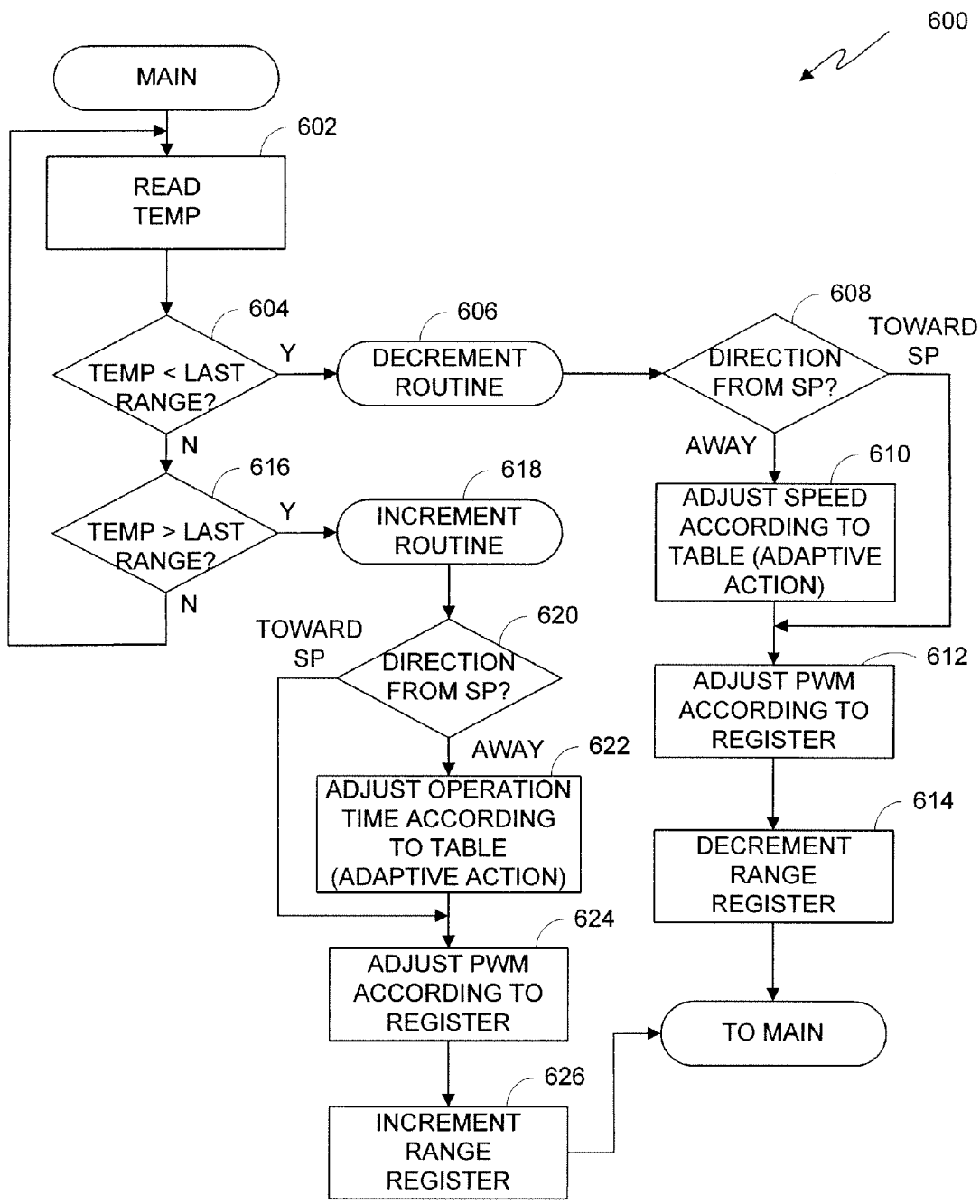
FIG. 6 is a flow chart showing a method for controlling a variable speed pump that can be used in conjunction with the table of FIG. 4.
Figure 7:
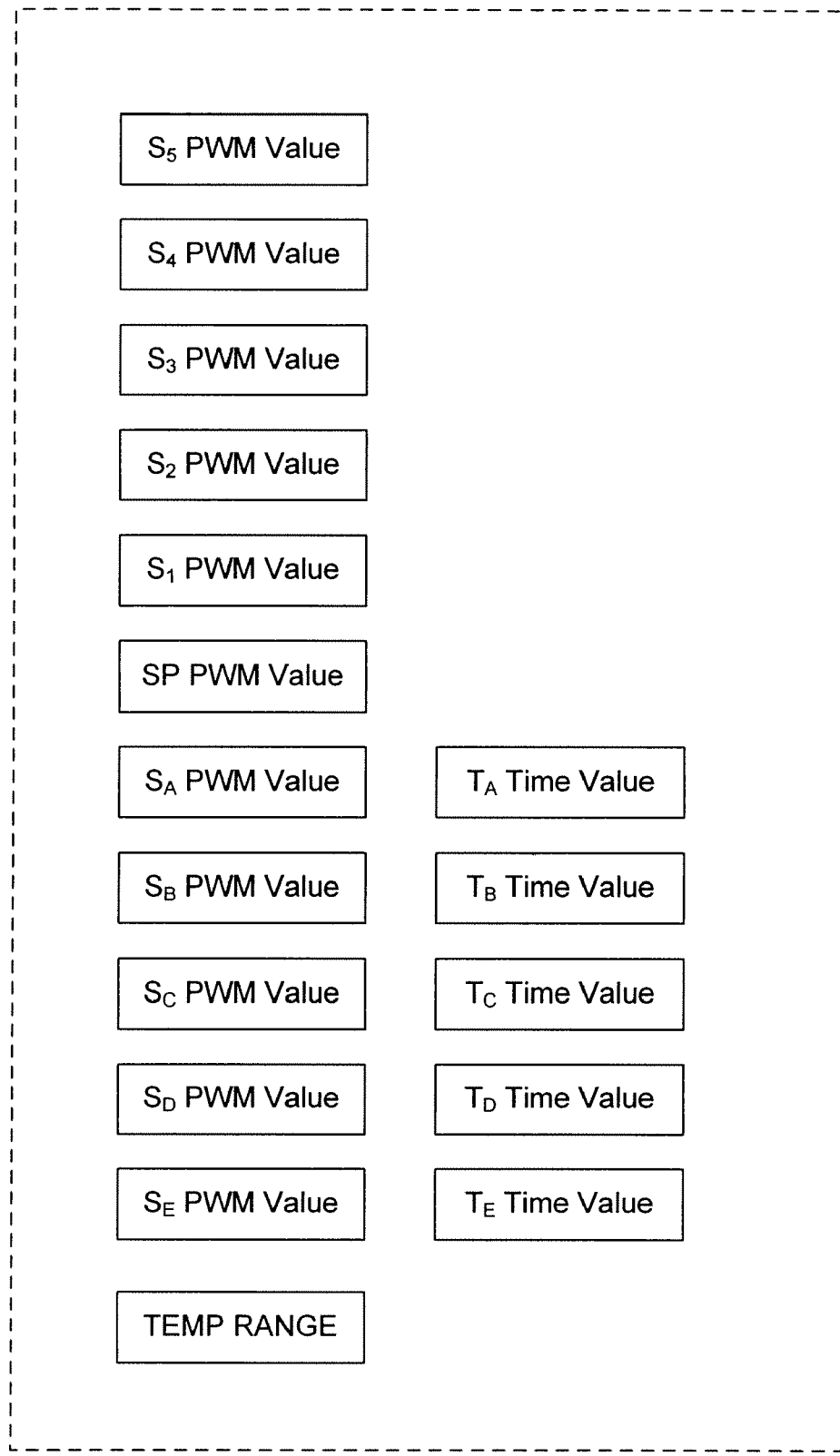
FIG. 7 is a block diagram illustrating registers that can be used to store values in conjunction with the methods of FIG. 4-6.

FIG. 6 is a flow chart showing a method for controlling a variable speed pump that can be used in conjunction with the table of FIG. 4. The method 600 begins by reading (602) a measured temperature of water in a hot water system. If the measured temperature is lower than the last stored range (604), the method performs a decrement routine 606. In the decrement routine, the method determines the direction of measured temperature as compared (608) to the setpoint. If measured temperature is moving away from the setpoint, then the method adjusts (610) the pump speed in accordance with the table 400 of FIG. 4. The method then adjusts (612) the current pump speed (PWM) according to the table 400 of FIG. 4. In several embodiments, the pump speed values are stored in multiple registers in a memory. FIG. 7 is a block diagram illustrating registers that can be used to store values in conjunction with the methods of FIG. 4-6. If the temperature is moving towards the setpoint, then the method similarly adjusts (612) the current pump speed (PWM) according to the table 400 of FIG. 4. The method decrements (614) a range register to store the current temperature range and returns to reading (602) measured temperature.

Returning to 604, if the measured temperature is not lower than (604) the last range and not greater than (616) the last range, then the method returns to reading (602) the temperature. If the measured temperature is greater than (616) the last range, the method performs an increment routine 618. In the increment routine, the method determines the direction of the temperature as compared (620) to the setpoint. If the temperature is moving away from the setpoint, the method adjusts (622) the operating time in accordance with table 400 of FIG. 4 (e.g., adaptive action). In several embodiments, the operating time is stored in one or more registers which are therefore updated (e.g., see FIG. 7). The method then adjusts (624) the pump speed (PWM) according to the table 400 of FIG. 4. Pump speed (PWM) values can be stored in the registers depicted in FIG. 7. If the temperature is moving toward the setpoint, then the method also adjusts (624) the pump speed (PWM) according to the table 400 of FIG. 4. The method then increments the range register to store the current temperature range and returns to reading (602) measured temperature.

In one embodiment, the method can perform the illustrated actions in any order. In another embodiment, the method can omit one or more of the actions. In some embodiments, the method performs additional actions in conjunction with the method. In other embodiments, one of more of the actions are performed simultaneously.

FIG. 7 is a block diagram illustrating registers that can be used to store values in conjunction with the methods of FIGS. 4-6. Registers for storing pump speeds which correspond to the temperature ranges depicted in table 400 of FIG. 4 are shown in FIG. 7. In addition, a "TEMP RANGE" register depicted can be used to store the current temperature range. Further, time of operation ("Time Value") registers are shown for each of the lower temperature ranges. In other embodiments, other registers or other arrangements of storage registers can be used. In some embodiments, additional registers can be used to store speed, time values or other parameters corresponding to operation of the control unit. In some embodiments, some of the illustrated registers can be omitted.

Figure 8:
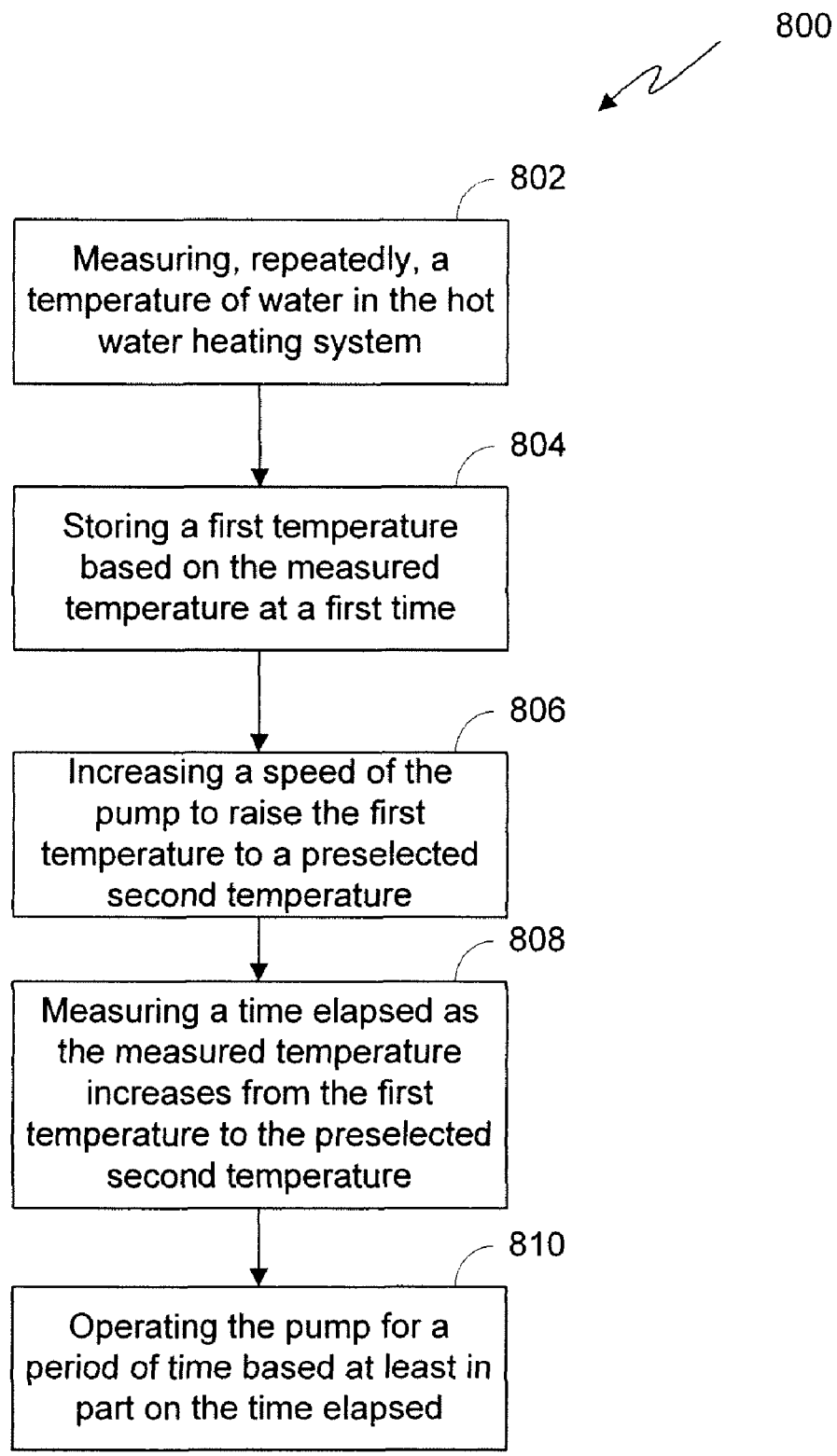
FIG. 8 is a flow chart illustrating a method for adjusting operation of a variable speed pump based on recovery time to reduce or prevent overshooting of a setpoint temperature in accordance with one embodiment of the present invention.

FIG. 8 is a flow chart illustrating a method 800 for adjusting operation of a variable speed pump based on recovery time to reduce or prevent overshooting of a setpoint temperature in accordance with one embodiment of the present invention. The method measures (802), repeatedly, a temperature of water in the hot water heating system. The method then stores (804) a first temperature based on the measured temperature at a first time. In a number of embodiments, the first temperature is measured at an inflection point below the setpoint temperature where the measured temperature stops decreasing and begins increasing. The method increases (806) a speed of the pump to raise the first temperature to a preselected second temperature. In some embodiments, the second temperature is the upper range temperature of Range 1 in FIG. 4.

The method then measures (808) a time elapsed as the measured temperature increases from the first temperature to the preselected second temperature. The method operates (810) the pump for a period of time based at least in part on the time elapsed. In several embodiments, the method operates the pump based on a percentage of the time elapsed or recovery time. In a number of embodiments, the recovery time is used to compute a time of operation for ranges below the setpoint. In such case, the system continually improves performance by reducing the chance, in the future, of overshooting the setpoint. Such action can provide a robust control algorithm for maintaining a constant temperature.

In one embodiment, the method can perform the illustrated actions in any order. In another embodiment, the method can omit one or more of the actions. In some embodiments, the method performs additional actions in conjunction with the method. In other embodiments, one of more of the actions are performed simultaneously.

Figure 9:
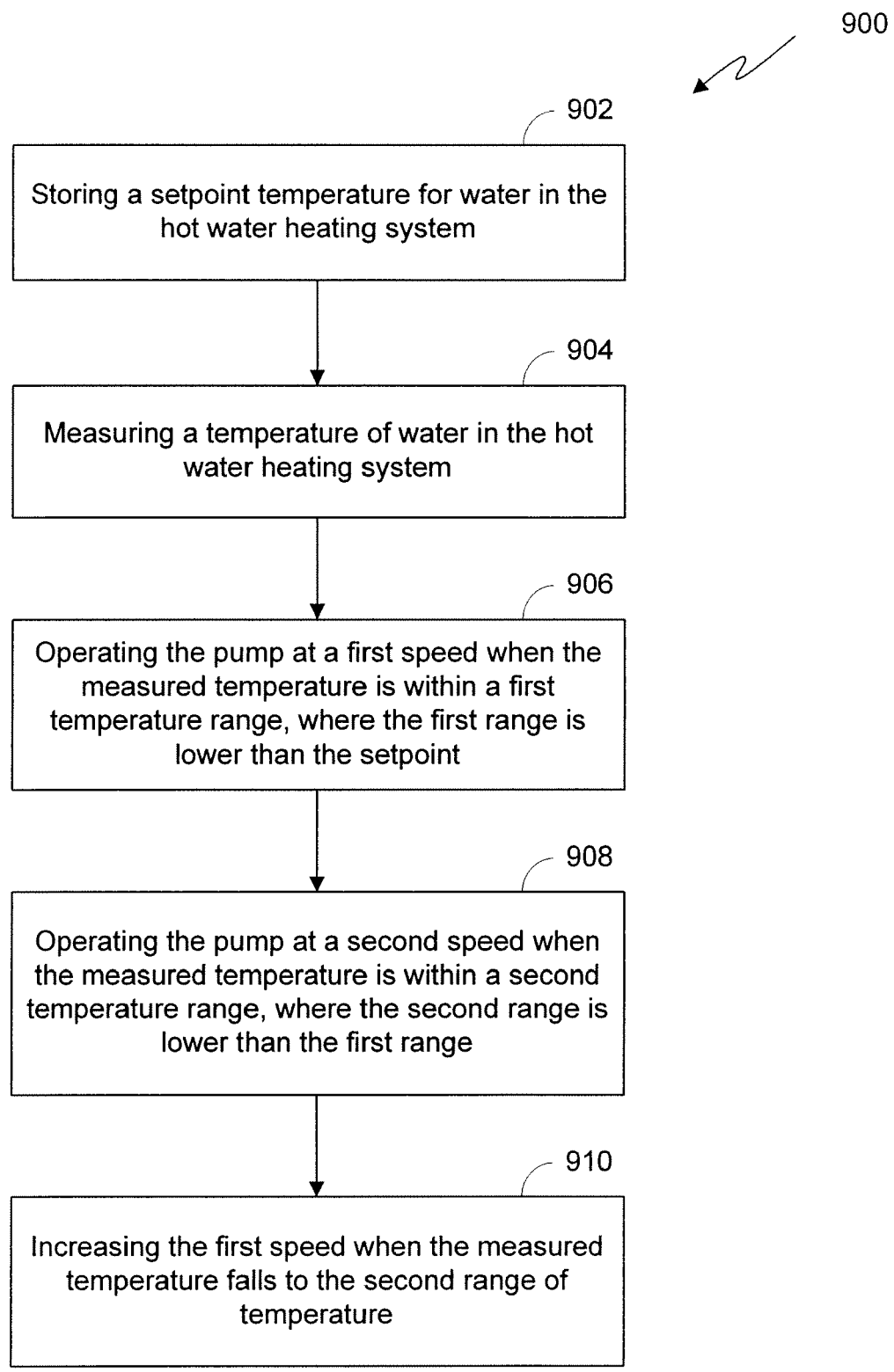
FIG. 9 is a flow chart illustrating a method for adjusting operation of a variable speed pump to improve system recovery to temperature drops below the setpoint temperature in accordance with one embodiment of the present invention.

FIG. 9 is a flow chart illustrating a method 900 for adjusting operation of a variable speed pump to improve system recovery to temperature drops below the setpoint temperature in accordance with one embodiment of the present invention. The method stores (902) a setpoint temperature for water in the hot water heating system. In a number of embodiments, the setpoint temperature is specified by the operator of a control unit executing the method. In such case, the operator can use the operator interface to change many parameters of the hot water system including the setpoint temperature, range values and associated motor speeds and periods of operation.

The method then measures (904) a temperature of water in the hot water heating system. In several embodiments, the measurement is made by a temperature sensor located along the return conduit of the hot water system. The method operates (906) the pump at a first speed when the measured temperature is within a first range of temperature, where the first range is lower than the setpoint. The method then operates (908) the pump at a second speed when the measured temperature is within a second range of temperature, where the second range of temperature is lower than the first range. The method increases (910) the first speed when the measured temperature falls to the second range of temperature. In several embodiments, the system effectively adapts itself to improve the ability to respond to future drops in temperature. In such case, the system provides for a robust and dynamic control algorithm for maintaining a constant temperature.

In one embodiment, the method can perform the illustrated actions in any order. In another embodiment, the method can omit one or more of the actions. In some embodiments, the method performs additional actions in conjunction with the method. In other embodiments, one of more of the actions are performed simultaneously.

Figure 10:
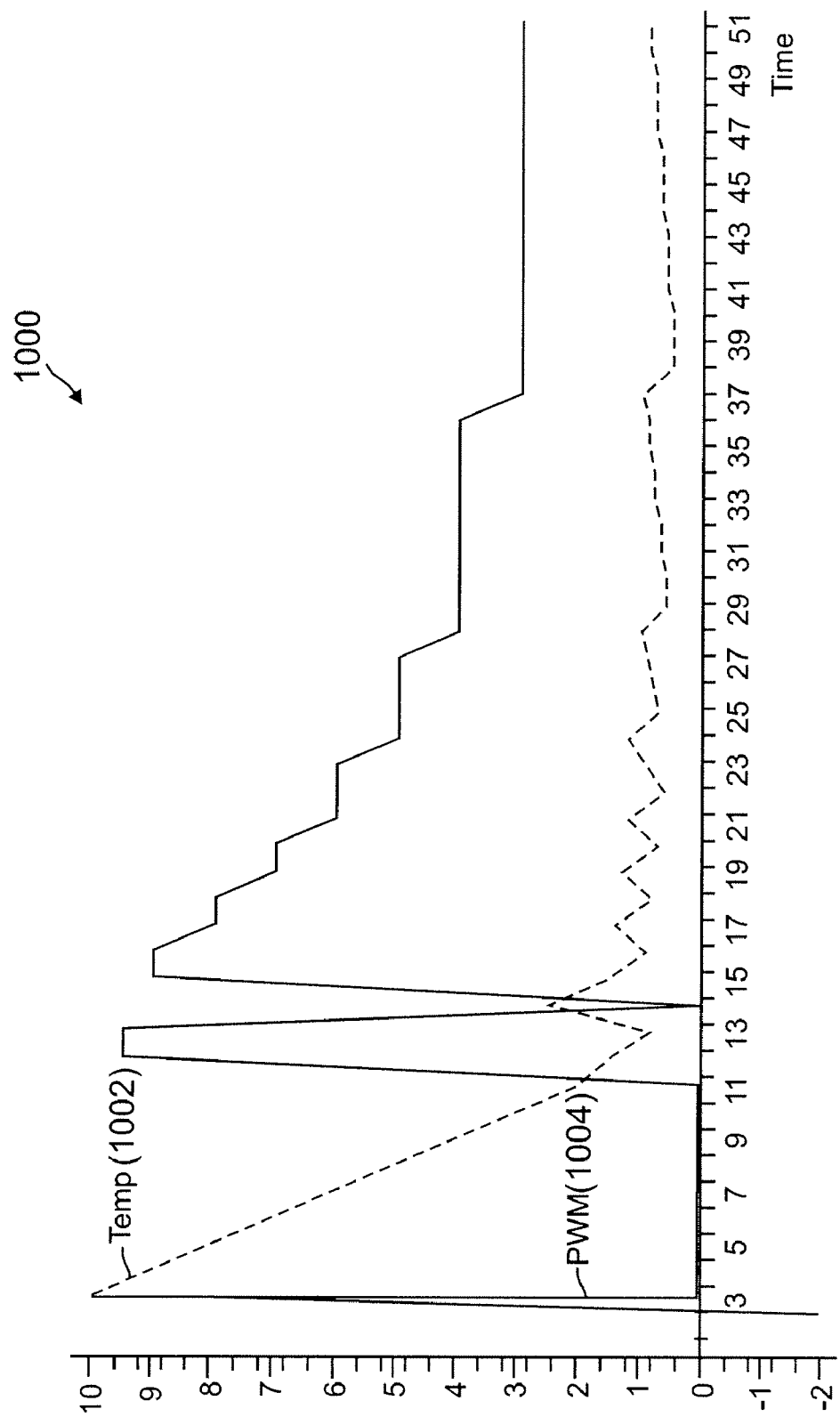
FIG. 10 is a graph of temperature and percentage versus time illustrating a measured temperature in a recirculating hot water system and a corresponding pulse width modulated (PWM) signal, expressed as a percentage, applied to a variable speed pump in accordance with one embodiment of the present invention.

FIG. 10 is a graph of temperature and percentage versus time illustrating a measured temperature 1002 in a recirculating hot water system and a corresponding pulse width modulated (PWM) signal 1004, expressed as a percentage, applied to a variable speed pump in accordance with one embodiment of the present invention. In the embodiment illustrated in FIG. 10, the temperature 1002 and resulting PWM signal 1004 correspond to the methods of operation described in FIGS. 4-9. Initially, the temperature 1002 increases to approximately 10 degrees over the setpoint temperature. In response, the control unit (not shown) decreases the pump speed or PWM signal to zero in accordance with the table of FIG. 4. As the pump does not operate to circulate hot water in the system, the temperature decreases. As the temperature dips into Range 1 at just below 2 degrees, the control unit increases the pump speed (PWM) 1004 to 9.5 percent, not 10 percent since Range 1 had already been exceeded and $S_1$ was therefore reduced 5 percent to 9.5 percent.

The temperature 1002 then continues to drop into the setpoint range and then begins increasing. As the temperature 1002 increases beyond Range 1, the control unit stops the pump (PWM=0) in accordance with the table. The temperature 1002 then drops into Range 1, the stored pump speed for Range 1 having been decreased by 5 percent again since the temperature entered Range 1 again. The temperature 1002 oscillates back and forth between Range 1 and the setpoint range while the pump speed continually decreases due to the 5 percent scaling. A steady state temperature within the setpoint range is ultimately achieved.

In other embodiments, other temperature ranges, setpoints and scaling factors can be used. In addition, other pump control speeds can be used.

Figure 11:
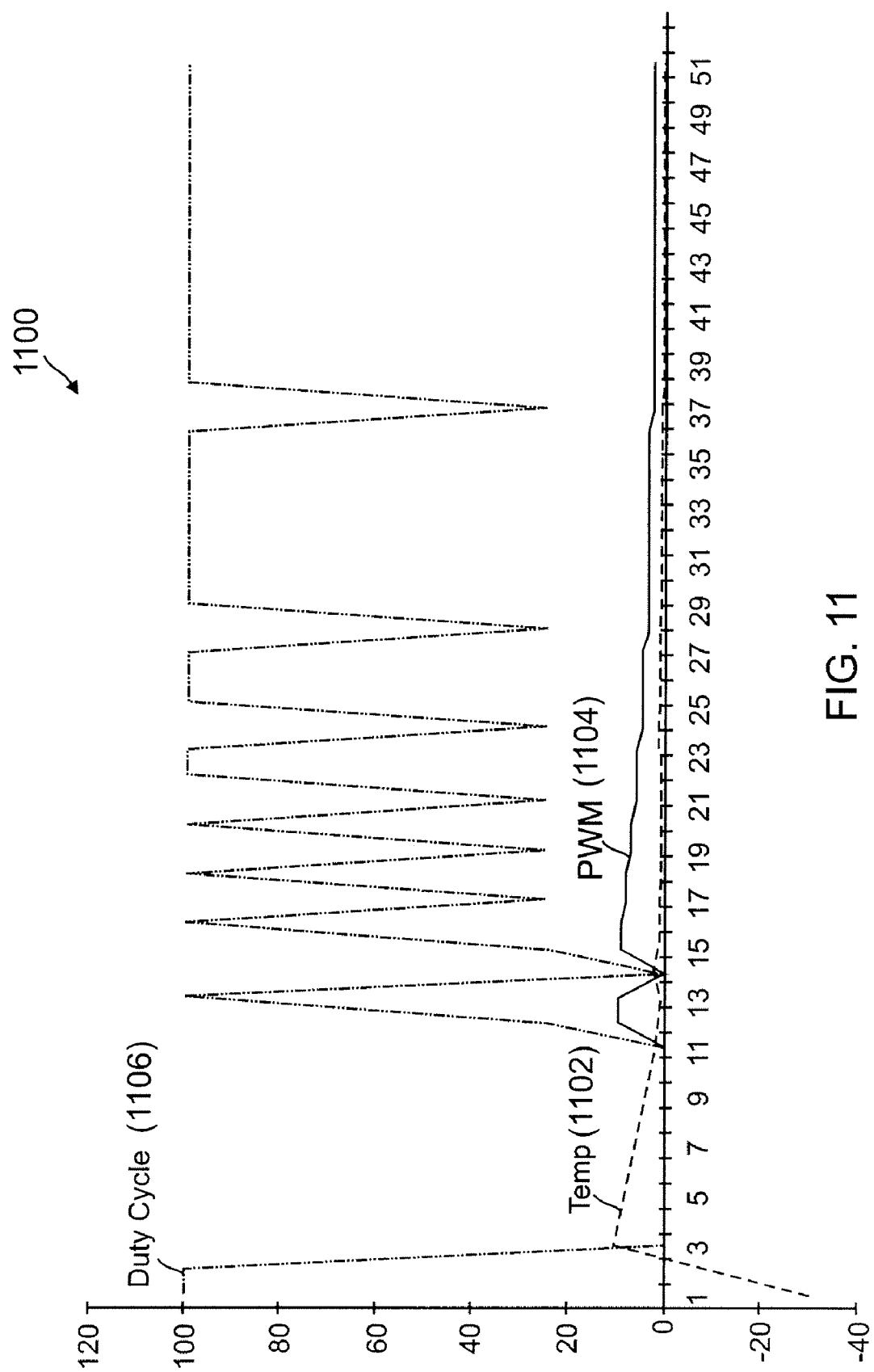
FIG. 11 is a graph of temperature and percentage versus time illustrating a measured temperature in a recirculating hot water system, a corresponding PWM signal and duty cycle, expressed as a percentage, that is applied to a variable speed pump in accordance with the embodiment illustrated in FIG. 10.

FIG. 11 is a graph 1100 of temperature and percentage versus time illustrating a measured temperature 1102 in a recirculating hot water system and a corresponding pulse width modulated signal 1104 and duty cycle 1106, expressed as a percentage, that is applied to a variable speed pump in accordance with the embodiment illustrated in FIG. 10. In FIG. 11, the illustrations of temperature 1102 and pump speed (PWM) 1104 are similar to those of FIG. 10 except that the common vertical scale has been changed to illustrate the duty cycle 1106. As in the table of FIG. 4, the one-fourth duty cycle is applied while the temperature is in Range 1 for scaling down the pump speed (PWM) signal. In FIG. 11, the duty cycle is generally increased to 100 percent for a quarter of the period at which the temperature is in Range 1. In other respects, FIG. 11 generally depicts the same waveforms as FIG. 10. As shown in FIG. 11, the duty cycle oscillates a bit as the temperature oscillates between Range 1 and the setpoint range. Ultimately the temperature 1102 settles within the setpoint and the duty cycle settles to 100 percent, corresponding to operation of the pump without a reduction in pump speed. A steady state temperature within the setpoint range is ultimately achieved.

Figure 12:
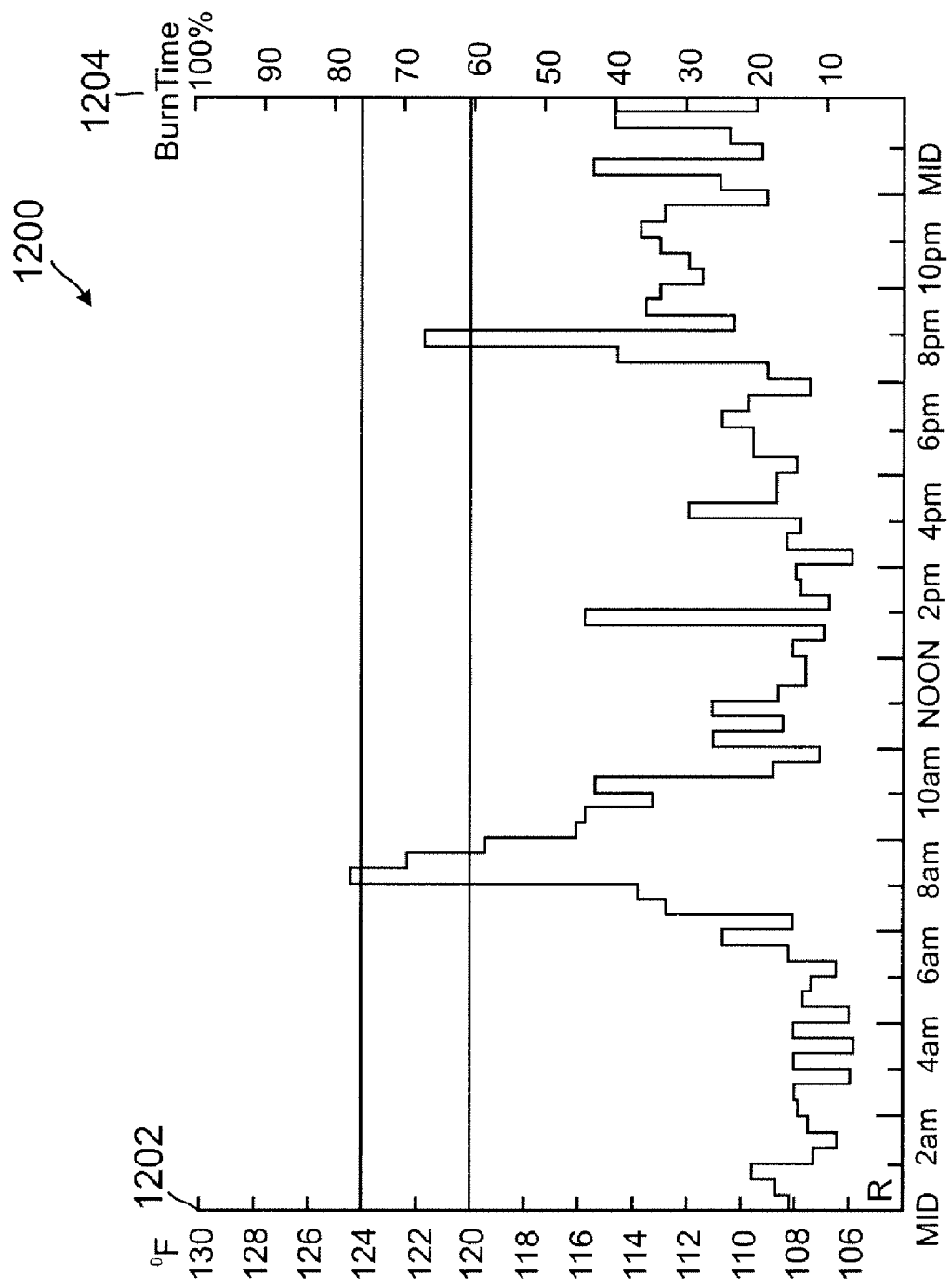
FIG. 12 is a graphical representation of the water temperature and burn time for a typical recirculating hot water system over a period of 24 hours in accordance with one embodiment of the present invention.

FIG. 12 is a graphical representation 1200 of water temperature 1202 and burn time 1204 for a typical recirculating hot water system over a period of 24 hours in accordance with one embodiment of the present invention. The graph illustrates a substantial peak in hot water demand at approximately 8:30 am, at which time the water heater increases supply temperatures up to 124 degrees Fahrenheit in order to accommodate the sudden demand in hot water. Another peak is shown at approximately 9:00 pm. A typical recirculation pump often runs non-stop. Accordingly, for much or all of the off peak time, the control unit of the current invention can reduce the operating speed of the recirculation pump or stop it all together. Such practice results in substantial energy savings and increased efficiency for the entire recirculating hot water system.

In several embodiments described above, the recirculation pump is a variable speed pump. In some embodiments, however, the recirculation pump can be a conventional pump (e.g., the existing recirculation pump in a hot water system) that can be made to operate with variable speed by modifying either the average power delivered by way of any number power delivery techniques, including, for example, pulse width modulation, phase modulation, or other methods known in the art for controlling power delivery to a pump or motor.

From the above, it can be seen that the system and method of the present invention minimizes use of a recirculation pump while maintaining an acceptable and relatively constant temperature of hot water for users at all of the water consumption taps, including, for example, the user at the last tap. This saves a substantial amount of energy and extends equipment life without limiting the supply of hot water to consumers.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A recirculating hot water system comprising:
a storage tank for storing heated water;
a recirculation conduit comprising:
a supply conduit for supplying the heated water to users via a plurality of outlets having a first outlet and a last outlet; and
a return conduit for returning an unused portion of the heated water to the storage tank;
a pump for circulating the heated water, the pump disposed along the return conduit;
a temperature sensor, disposed along the recirculation conduit, for generating a temperature signal indicative of a temperature of the heated water; and
a control unit, coupled to the pump, for changing a speed of the pump based on the temperature signal, wherein the control unit is configured to:
store a first temperature value of the temperature signal at a first time;
increase the speed of the pump to raise the temperature of the heated water to a preselected second temperature value;
measure a time elapsed as the measured temperature increases from the first temperature to the preselected second temperature; and
operate the pump for a period of time based at least in part on the time elapsed.

2. The recirculating hot water heating system of claim 1, wherein the temperature sensor is disposed along the return conduit.

3. The recirculating hot water heating system of claim 1, wherein the temperature sensor is disposed along the return conduit proximate the pump.

4. The recirculating hot water heating system of claim 1, wherein the temperature sensor is disposed proximate the last outlet.

5. The recirculating hot water heating system of claim 1, wherein the temperature sensor communicates with the control unit using wireless communication.

6. The recirculating hot water heating system of claim 1, wherein the temperature sensor communicates with the control unit using a wired connection.

7. A recirculating hot water system comprising:
a storage tank for storing heated water;
a recirculation conduit comprising:
a supply conduit for supplying the heated water to users via a plurality of outlets having a first outlet and a last outlet; and
a return conduit for returning an unused portion of the heated water to the storage tank;
a pump for circulating the heated water, the pump disposed along the return conduit;
a temperature sensor, disposed along the recirculation conduit, for generating a temperature signal indicative of a temperature of the heated water; and a control unit, coupled to the pump, for changing a speed of the pump based on the temperature signal, wherein the control unit is configured to:
operate the pump at a first speed when the temperature signal is indicative of a value within a first temperature range, wherein the first range is lower than a preselected setpoint temperature;
operate the pump at a second speed when the temperature signal is indicative of a value within a second temperature range, wherein the second range is lower than the first range; and
increase the first speed when the temperature signal falls to the second range.

8. A method for controlling a temperature of water in a recirculating hot water system including a storage tank for storing heated water, a recirculation conduit comprising a supply conduit for supplying the heated water to users via a plurality of outlets having a first outlet and a last outlet and a return conduit for returning an unused portion the heated water to the storage tank, a pump for circulating the heated water, the pump disposed along the return conduit, the method comprising:
measuring, at a point along the recirculation conduit, a temperature of the heated water provided from the storage tank;
controlling a speed of the pump, disposed along the return conduit, based on the measured temperature;
storing a first temperature based on the measured temperature;
increasing the speed of the pump to raise the heated water to a preselected second temperature;
measuring a time elapsed as the measured temperature increases from the first temperature to the preselected second temperature; and
operating the pump for a period of time based at least in part on the time elapsed.

9. The method of claim 8, wherein the measuring, at a point along the recirculation conduit, a temperature of the heated water provided from the storage tank comprises:
measuring, at a point along the return conduit, a temperature of the heated water provided from the storage tank.

10. The method of claim 8, wherein the measuring, at a point along the recirculation conduit, a temperature of the heated water provided from the storage tank comprises:
measuring, at a point along the return conduit proximate the pump, a temperature of the heated water provided from the storage tank.

11. The method of claim 8:
wherein the measuring, at a point along the recirculation conduit, a temperature of the heated water provided from the storage tank comprises:
measuring, at a point proximate the last outlet, a temperature of the heated water provided from the storage tank; and
wherein the last outlet is farther from the storage tank than other outlets of the plurality of outlets.

12. The method of claim 8, further comprising:
transmitting, using wireless communication, information indicative of the measured temperature; and
receiving, using wireless communication, the information indicative of the measured temperature.

13. A method for controlling a temperature of water in a recirculating hot water system including a storage tank for storing heated water, a recirculation conduit comprising a supply conduit for supplying the heated water to users via a plurality of outlets having a first outlet and a last outlet and a return conduit for returning an unused portion the heated water to the storage tank, a pump for circulating the heated water, the pump disposed along the return conduit, the method comprising:
measuring, at a point along the recirculation conduit, a temperature of the heated water provided from the storage tank;
controlling a speed of the pump, disposed along the return conduit, based on the measured temperature;
operating the pump at a first speed when the measured temperature is within a first temperature range, wherein the first temperature range is lower than a preselected setpoint temperature;
operating the pump at a second speed when the measured temperature is within a second temperature range, wherein the second range is lower than the first range; and
increasing the first speed when the measured temperature falls to the second range.

14. A method for controlling a pump in a recirculating hot water heating system, the method comprising:
measuring, repeatedly, a temperature of water in the hot water heating system;
storing a first temperature based on the measured temperature at a first time;
increasing a speed of the pump to raise the first temperature to a preselected second temperature;
measuring a time elapsed as the measured temperature increases from the first temperature to the preselected second temperature; and
operating the pump for a period of time based at least in part on the time elapsed.

15. The method of claim 14, wherein the storing a first temperature based on the measured temperature at a first time comprises:
detecting an inflection point indicative of a transition from a decreasing trend in the measured temperature to an increase in the measured temperature; and
storing the measured temperature at the inflection point as the first temperature.

16. The method of claim 14, further comprising:
storing a setpoint temperature for water in the hot water heating system;
wherein the first temperature is less than the setpoint temperature; and
wherein the preselected second temperature is greater than the setpoint temperature.

17. The method of claim 16, further comprising:
storing a lower temperature range that is lower than the setpoint temperature; and
storing a time period for pump operation associated with the lower temperature range;
wherein the operating the pump for a period of time based at least in part on the time elapsed comprises:
changing the time period for pump operation to a percentage of the time elapsed; and
operating the pump for the time period for pump operation while the measured temperature is within the lower temperature range.

18. The method of claim 16, further comprising:
storing a lower temperature range that is lower than the setpoint temperature; and
storing a time period for pump operation associated with the lower temperature range;
storing an upper temperature range that is higher than the setpoint temperature; and
wherein the operating the pump for a period of time based at least in part on the time elapsed comprises:

changing the time period for pump operation to a percentage of the time elapsed when the measured temperature increases to a level within the upper temperature range; and operating the pump for the time period for pump operation while the measured temperature is within the lower temperature range.

19. The method of claim 14, wherein the operating the pump for a period of time based at least in part on the time elapsed comprises operating the pump, at a preselected speed, for a period of time based at least in part on the time elapsed.

20. The method of claim 14:
wherein the measuring, repeatedly, a temperature of water in the hot water heating system comprises measuring, repeatedly, a temperature of water in the hot water heating system at a point along a portion of a return conduit, the portion extending from a last tap along a supply conduit to the pump;
wherein the return conduit is coupled to a supply conduit and to a storage tank;
wherein the supply conduit supplies heated water from the storage tank to a plurality of taps including the last tap;
wherein the return conduit returns an unused portion of heated water to the storage tank.

21. The method of claim 20, wherein the point along the portion of the return conduit is proximate the pump.

22. The method of claim 14, further comprising:
storing a setpoint temperature for water in the hot water heating system;
operating the pump at a first speed when the measured temperature is within a first temperature range, wherein the first range is lower than the setpoint;
operating the pump at a second speed when the measured temperature is within a second temperature range, wherein the second range is lower than the first range; and
increasing the first speed when the measured temperature falls to the second temperature range.

23. A method for controlling a pump in a recirculating hot water heating system, the method comprising:
storing a setpoint temperature for water in the hot water heating system;
measuring a temperature of water in the hot water heating system;
operating the pump at a first speed when the measured temperature is within a first temperature range, wherein the first range is lower than the setpoint;
operating the pump at a second speed when the measured temperature is within a second temperature range, wherein the second range is lower than the first range; and
increasing the first speed when the measured temperature falls to the second temperature range.

24. The method of claim 23, further comprising:
operating the pump at a third speed when the measured temperature is within a third temperature range, wherein the third range is lower than the second range; and
increasing the second speed when the measured temperature falls to the third temperature range.

25. The method of claim 23:
wherein the measuring a temperature of water in the hot water heating system comprises measuring the temperature of water in the hot water heating system at a point along a portion of a return conduit, the portion extending from a last tap along a supply conduit to the pump;
wherein the return conduit is coupled to a supply conduit and to a storage tank;
wherein the supply conduit supplies heated water from the storage tank to a plurality of taps including the last tap;
wherein the return conduit returns an unused portion of heated water to the storage tank.

26. The method of claim 25, wherein the point along the portion of the return conduit is proximate the pump.

27. The method of claim 23, further comprising:
storing a first temperature based on the measured temperature at a first time;
increasing a speed of the pump to raise the first temperature to a preselected second temperature;
measuring a time elapsed as the measured temperature increases from the first temperature to the preselected second temperature; and
operating the pump for a period of time based at least in part on the time elapsed.

* * * * *